(12) United States Patent
Kim et al.

(10) Patent No.: US 8,115,524 B2
(45) Date of Patent: *Feb. 14, 2012

(54) SEMICONDUCTOR DEVICE HAVING AUTO CLOCK ALIGNMENT TRAINING MODE CIRCUIT

(75) Inventors: Young-Ran Kim, Gyeonggi-do (KR); Jung-Hoon Park, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 57 days.

This patent is subject to a terminal disclaimer.

(21) Appl. No.: 12/630,518

(22) Filed: Dec. 3, 2009

(65) Prior Publication Data

US 2011/0050295 A1    Mar. 3, 2011

(30) Foreign Application Priority Data

Sep. 1, 2009    (KR) .................. 10-2009-0082098

(51) Int. Cl.
*G11C 8/18* (2006.01)
*H03L 7/00* (2006.01)

(52) U.S. Cl. ........ 327/144; 327/145; 327/146; 327/163; 365/189.07; 365/233.1; 365/233.11; 365/233.12

(58) Field of Classification Search .......... 327/142–147, 327/155, 156, 162, 163; 365/189.011, 189.07, 365/191, 233.1, 233.11–233.13

See application file for complete search history.

(56) References Cited

U.S. PATENT DOCUMENTS

| 7,834,664 B2 * | 11/2010 | Yoon et al. ................. 327/3 |
| 7,859,939 B2 * | 12/2010 | Joo et al. .................. 365/233.1 |
| 7,889,594 B2 * | 2/2011 | Yoon et al. ................. 365/233.1 |
| 7,889,595 B2 * | 2/2011 | Park .......................... 365/233.1 |

FOREIGN PATENT DOCUMENTS

| KR | 100929828 | 12/2009 |
| KR | 1020100006873 | 1/2010 |

OTHER PUBLICATIONS

Notice of Allowance issued from Korean Intellectual Property Office on Feb. 19, 2011.

* cited by examiner

*Primary Examiner* — Patrick O'Neill
(74) *Attorney, Agent, or Firm* — IP & T Group LLP

(57) ABSTRACT

A semiconductor device for applying an auto clock alignment training mode to reduce the time required for a clock alignment training operation. The semiconductor device adjusts the entry time of the auto clock alignment training mode to prevent the clock alignment training operation from malfunctioning. The semiconductor device includes a clock division block configured to divide a data clock to generate a data division clock, a phase multiplex block configured to generate a plurality of multiple data division clocks in response to the data division clock, a logic level control block configured to set a period, in which a division control signal is changeable, depending on the data division clock, and a first phase detection block configured to detect a phase of a system clock on the basis of the multiple data division clocks in the period, and to generate the division control signal corresponding to a detection result.

16 Claims, 6 Drawing Sheets

SEMICONDUCTOR DEVICE HAVING AUTO CLOCK ALIGNMENT TRAINING MODE CIRCUIT

CROSS-REFERENCE TO RELATED APPLICATIONS

The present application claims priority of Korean Patent Application No. 10-2009-0082098, filed on Sep. 1, 2009, which is incorporated herein by reference in its entirety.

BACKGROUND OF THE INVENTION

Exemplary embodiments of the present invention relate to a semiconductor design technology, and more particularly, to a semiconductor device, which operates at a high speed, performing a clock alignment training operation.

Semiconductor devices are used to store data of a system that they belong to. The semiconductor devices are provided with the data by a data process device of the system, (e.g., a memory control unit) to store data in response to addresses inputted from the data process device. When the data process device requests data stored in the semiconductor devices, the semiconductor devices output data corresponding to addresses inputted from the data process device.

For this, semiconductor devices for operating at high speeds that have recently been developed are designed to input/output two data (e.g., two data bits) between a rising edge and a falling edge of a system clock, which is inputted from an external device, and input/output another two data between the falling edge and the next rising edge of the system clock. That is, the semiconductor device input/outputs four data during a period of the system clock.

However, the system clock has only two states (i.e., logic high and low states). In order to input/output four data during one period of the system clock, the semiconductor device needs a data clock having a frequency higher than that of the system clock. For example, a data clock at double the frequency, compared with the system clock, is used as a reference clock for the input/output of the data.

The semiconductor device receives commands and addresses in response to the system clock, and input/outputs data in response to the data clock by controlling the data clock to have double the frequency than that of the system clock. Therefore, two periods of the data clock are matched with one period of the system clock. The semiconductor device input/outputs data at both rising and falling edges of the data clock. Therefore, four data can be inputted/outputted during one period of the system clock.

Compared with semiconductor devices using one system clock as a reference clock for read/write operations, semiconductor devices in accordance with the embodiment of the present invention use plural clocks having different frequencies than each other for read/write operations. Accordingly, it is necessary to synchronize the plural clocks for semiconductor devices to operate normally. That is, phases of a system clock and a data clock need to be aligned, otherwise the timings for transferring commands/addresses and data are mismatched and the semiconductor devices cannot operate normally. Therefore, at the initial operation of the semiconductor device, training operations, such as interface training, are performed between the semiconductor device and a data process device.

The interface training represents an operation for training the semiconductor device and the data process device prior to their normal operation, in order for commands, addresses, and data to be transferred at the optimum interface. The interface training includes an address training, a clock alignment training (WCK2CK Training), a read training, and a write training. During the clock alignment training, a system clock and a data clock are aligned.

FIG. 1 is a block diagram illustrating a conventional clock alignment training circuit of a semiconductor device.

As described above, a semiconductor device receives commands and addresses from an external controller (i.e., a data process device) on the basis of a system clock HCK, and input/outputs data on the basis of a data clock WCK. Especially at the write operation, the semiconductor device outputs data corresponding to the received commands and addresses to the external controller on the basis of the data clock WCK. If the phase of the system clock HCK is not aligned with that of the data clock WCK, the data may be outputted to the external controller sooner or later than they are requested to be.

To output the data at desired timings, at the initial operation of the semiconductor memory device, a clock alignment training circuit detects a phase difference between the system clock HCK and the data clock WCK received from the controller. The clock alignment training circuit transfers the detected phase difference to the controller to reduce the phase difference. This process of detecting and reducing the phase difference is referred to as the clock alignment training.

Referring to FIG. 1, the clock alignment training circuit includes a clock input block 100, a clock division block 120, a phase detection block 140, and a signal transfer block 160. The clock input block 100 receives the system clock HCK and the data clock WCK. As described above, the system clock HCK is a reference clock for synchronizing the inputs of commands and addresses. The data clock WCK is a reference clock for synchronizing the inputs of data, which has a frequency higher than the system clock HCK.

The clock division block 120 divides the data clock WCK to generate a data division clock DIV_WCK having the same frequency as the system clock HCK. The phase detection block 140 detects the phase difference between the system clock HCK and the data division clock DIV_WCK to generate a detection signal DET_SIG corresponding to the detection result (i.e., the detected phase difference). The signal transfer block 160 outputs the detection signal DET_SIG as a training information signal TRAINING_INFO_SIG to an external controller.

FIG. 2 is a signal timing diagram illustrating an operation of the clock alignment training circuit shown in FIG. 1.

Referring to FIG. 2, the frequency of the data clock WCK, inputted to the clock alignment training circuit, is greater than that of the system clock HCK. The frequency of the data division clock DIV_WCK, divided from the data clock WCK by the clock division block 120, is equal to that of the system clock HCK.

However, edges of the system clock HCK and the data clock WCK (or the data division clock DIV_WCK) are not aligned with each other prior to the clock alignment training operation (e.g., at a point of time marked as ① in FIG. 2). That is, before the clock alignment training operation starts, the phase of the system clock HCK is not synchronized with that of the data clock WCK.

After the clock alignment training operation starts (e.g., at a point of time between time points marked as ② and ⑥), the phase of the data clock WCK is adjusted, so that the phases of the data clock WCK and the system clock HCK are synchronized with each other.

At this time, the phase of the data clock WCK changes in response to the training information signal TRAINING_INFO_SIG outputted by the signal transfer block 160. Depending on the logic level of the training information signal TRAINING_INFO_SIG (e.g., a logic low level) the external controller, which receives the training information signal TRAINING_INFO_SIG, changes the phase of the data clock WCK to be outputted to the clock alignment training circuit.

As the phase of the data clock WCK becomes synchronized with that of the system clock HCK (at a point of time marked as ⑥), the training information signal TRAINING_INFO_SIG transitions from a logic low level to a logic high level. In the period (marked as ⑦) where the training information signal TRAINING_INFO_SIG is maintained in the logic high level, the phase of the data clock WCK no longer changes. That is, depending on the logic high level of the training information signal TRAINING_INFO_SIG, the external controller outputs the data clock WCK having its phase fixed. In conclusion, the clock alignment training circuit continuously compares the phases of the data clock WCK and the system clock HCK, and outputs the comparison result to an external controller, until the phases of the data clock WCK and the system clock HCK are synchronized with each other.

As the clock alignment training circuit is provided to the semiconductor device, it is possible to perform the clock alignment training operation at a power-up time, when the semiconductor device is supplied with a supply voltage at initial operation. However, there is a need to perform the clock alignment training operation at an exit time, when the semiconductor device exits from a specific operation mode.

The semiconductor device has a power down mode for reducing its power consumption, and does not input/output data in that mode. Accordingly, only the system clock HCK is inputted to the semiconductor device in the power down mode (i.e., the data clock WCK is not inputted). However, at the end of the power down mode, the data clock is inputted to the semiconductor device again. Therefore, the phase of the data clock WCK may have changed, so that it is not synchronized with the phase of the system clock HCK. The clock alignment training operation must be performed at the end of operation modes of the semiconductor device, such as the power down mode, in order to synchronize the phases of the data clock WCK and the system clock HCK.

During the entry/exit process of the power down mode, it creates noise, which makes a jitter factor on the data clock WCK. The jitter factor is one of the reasons of a change in the phase of the data clock WCK. However, it rarely occurs, and even if it does, the data clock WCK with the changed phase can be synchronized with the system clock HCK through the clock alignment training operation in a relatively short time.

Turning off component parts of the clock alignment training circuit in the power down mode may affect the whole operation of the semiconductor device. Particularly, as the clock division block 120 is turned off/on in the entry/exit process of the power down mode, the timing of a clock division becomes misaligned. The power down mode may cause the data clock WCK to have its phase inverted. In this case, the clock alignment training circuit would have to change the phase of the data clock WCK by more than a ½ clock period in order to synchronize the phases of the data clock WCK and the system clock HCK. Further, synchronizing the phases of the data clock WCK and the system clock HCK takes a long time, and may delay the whole operation of the semiconductor device. Moreover, the higher the frequency of the system clock HCK and the data clock WCK, the more serious the delay problem becomes.

SUMMARY OF THE INVENTION

An embodiment of the present invention is directed to a semiconductor device for applying an auto clock alignment training mode to reduce the time required for a clock alignment training operation of the semiconductor device. The auto clock alignment training mode may be a clock alignment training mode used at the entry/exit of operation modes of the semiconductor device, as opposed to a normal clock alignment training mode for a power up operation of the semiconductor device In addition, the semiconductor device can adjust the entry point in time of the auto clock alignment training mode in the period of the operation modes of the semiconductor device, such as a power down mode, to prevent an auto clock alignment training operation from malfunctioning.

In accordance with an embodiment of the present invention, a semiconductor device includes a clock input block configured to generate a system clock and a data clock, a clock division block configured to divide the data clock to generate a data division clock, wherein the data division clock is inverted in response to a division control signal, a phase multiplex block configured to generate a plurality of multiple data division clocks having a predetermined phase different from each other in response to the data division clock, a logic level control block configured to set a period, in which the division control signal is changeable, depending on the data division clock, and a first phase detection block configured to detect a phase of the system clock on the basis of selected clocks of the plurality of multiple data division clocks in the period set by the logic level control block, and to generate the division control signal corresponding to a detection result.

The semiconductor device further includes a second phase detection block configured to detect the phase of the system clock on the basis of the data division clock, and determine a logic level of a training information signal in response to a detection result, and a signal transfer block configured to output the training information signal.

The clock input block includes a system clock generating unit configured to receive an external clock for synchronizing input timings of commands and addresses, and to output the system clock, and a data clock generating unit configured to receive an external clock for synchronizing input timings of data, and to output the data clock.

The clock division block is configured to invert the data division clock to be outputted when the division control signal is activated, and to output the data division clock without being inverted when division control signal is inactivated.

The selected clocks are selected from the plurality of multiple data division clocks by excluding the multiple data division clocks, which have an identical phase or an opposite phase to a phase of the data division clock.

The logic level control block is configured to activate an auto training mode enable signal when the data division clock toggles, and to inactivate the auto training mode enable signal when the data division clock is maintained at a constant level, wherein the auto training mode enable signal sets the period in which the division control signal changes. The logic level control block includes a toggling detection unit configured to detect the toggling of the data division clock on the basis of a toggling of the system clock, and a logic level determination unit configured to determine a logic level of the auto training mode enable signal in response to an output of the toggling detection unit. The toggling detection unit is configured to detect whether the data division clock toggles at predetermined times at which the system clock toggles.

The first phase detection block includes a phase comparison unit configured to compare a phase of the selected clocks with the phase of the system clock in the activation period of the auto training mode enable signal, and a logic level driving unit configured to receive predetermined numbers of output signals of the phase comparison unit and to drive the division control signal in response to the output signals, in the activation period of the auto training mode enable signal. The first phase detection block is configured to change a logic level of the division control signal when the output signals of the phase comparison unit are maintained at a same logic level, while the predetermined numbers of selected clocks change periodically.

In accordance with another embodiment of the present invention, a method of operating a semiconductor device receiving system and data clocks includes inputting the system clock to the semiconductor device in a power down mode, inputting the system and data clocks to the semiconductor device when the semiconductor device exits from the power down mode, generating a data division clock by dividing the data clock wherein the data division clock is inverted in response to a division control signal, generating a plurality of multiple data division clocks having a predetermined phase different from each other in response to the data division clock, detecting whether the data division clock toggles, detecting a phase of the system clock on the basis of predetermined multiple data division clocks of the plurality of multiple data division clocks, and generating the division control signal in response to a detection result of the data division clock and the system clock.

The method of operating the semiconductor device further includes detecting the phase of the system clock on the basis of the data division clock to determine a logic level of a training information signal, and outputting the training information signal.

The generating of the division control signal includes determining a logic level of the division control signal in response to the detection result of the system clock when the data division clock toggles, and maintaining the logic level of the division control signal when the data division clock is maintained at a constant level, regardless of the detection result of the system clock.

The generating of the data division clock includes inverting the data division clock to be outputted when the division control signal is activated, and outputting the data division clock without being inverted when the division control signal is inactivated.

The predetermined multiple data division clocks are selected from the plurality of multiple data division clocks by excluding the multiple data division clocks which have an identical phase or an opposite phase to a phase of the data division clock.

The detecting of the data division clock includes detecting whether the data division clock toggles at predetermined times at which the system clock toggles.

DESCRIPTION OF SPECIFIC EMBODIMENTS

Figure 1:
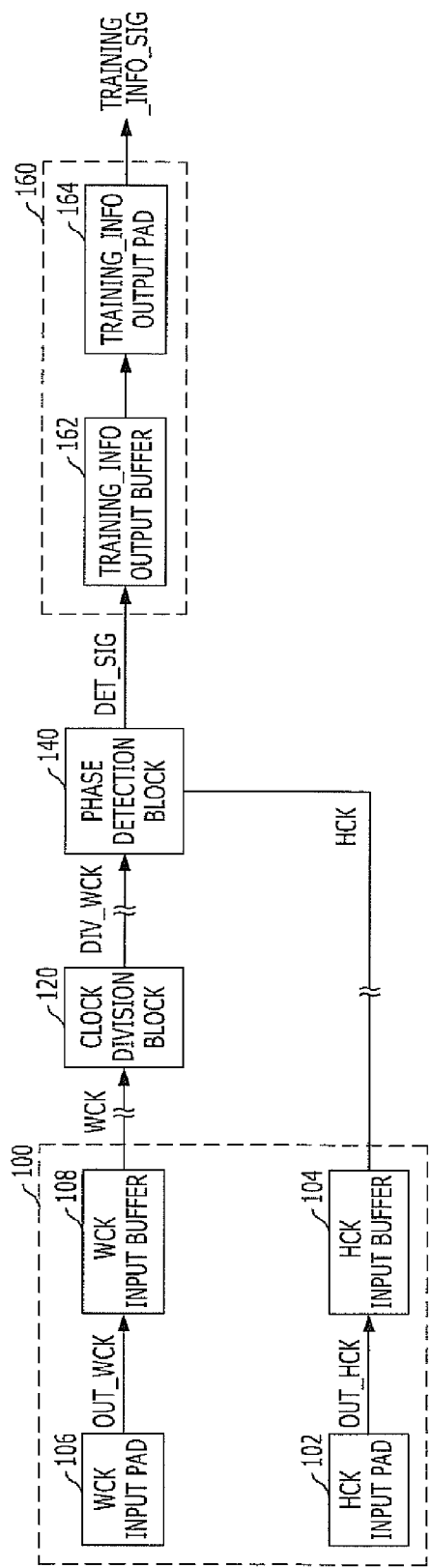
FIG. 1 is a block diagram illustrating a conventional clock alignment training circuit of a semiconductor device.
Figure 2:
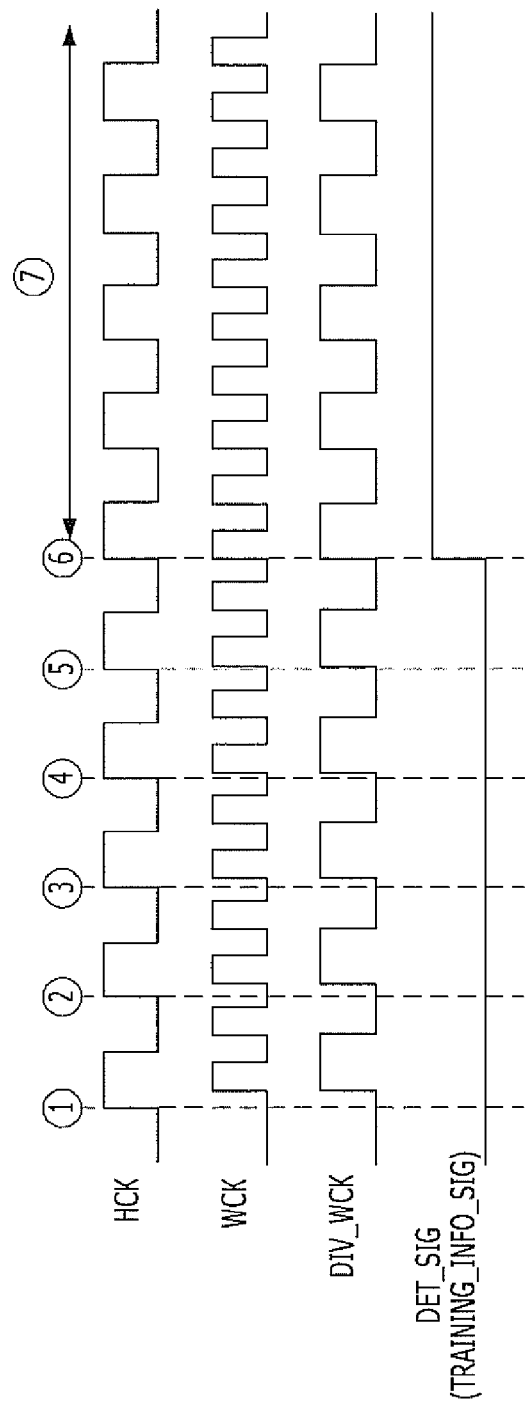
FIG. 2 is a signal timing diagram illustrating an operation of the clock alignment training circuit shown in FIG. 1.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
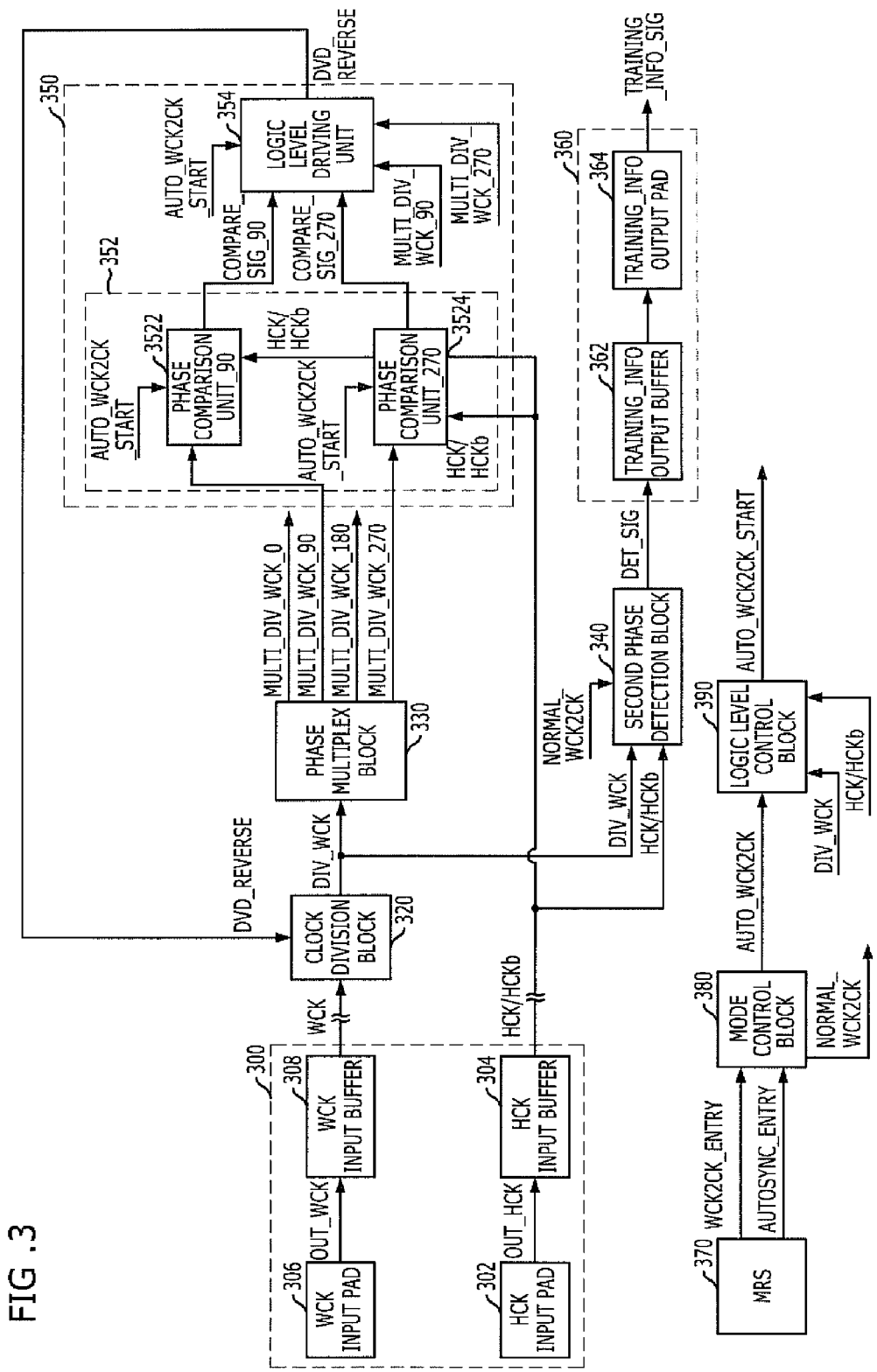
FIG. 3 is a block diagram illustrating a clock alignment training circuit in accordance with an embodiment of the present invention.

FIG. 3 is a block diagram illustrating a clock alignment training circuit in accordance with an embodiment of the present invention.

Referring to FIG. 3, the clock alignment training circuit includes a clock input block 300, a clock division block 320, a phase multiplex block 330, a logic level control block 390, and a first phase detection block 350. The clock alignment training circuit further includes a second phase detection block 340 and a signal transfer block 360.

The clock input block 300 inputs the system clock HCK and the data clock WCK to internal blocks. The system clock HCK is a reference clock for synchronizing the inputs of commands and addresses, and the data clock WCK is a reference clock for synchronizing the inputs of data, which has a frequency higher than the system clock HCK.

The clock division block 320 divides the data clock WCK to generate a data division clock DIV_WCK having the same frequency as the system clock HCK. The clock division block 320 generates the data division clock DIV_WCK and inverts it in response to a division control signal DVD_REVERSE. The phase multiplex block 330 generates plural multiple data division clocks MULTI_DIV_WCK_0, MULTI_DIV_WCK_90, MULTI_DIV_WCK_180, and MULTI_DIV_WCK_270 (hereinafter a plurality of similar signals are referred to using a short-hand form, such as, for example, MULTI_DIV_WCK_0/90/180/270), which have a predetermined phase difference from each other, in response to the data division clock DIV_WCK.

The logic level control block 390 adjusts the period, in which the logic level of the division control signal DVD_REVERSE is changeable, depending on whether the data division clock DIV_WCK toggles. Within the period adjusted by the logic level control block 390, the first phase detection block 350 detects the phase of the system clock HCK on the basis of selected clocks MULTI_DIV_WCK_90/270 of the multiple data division clocks MULTI_DIV_WCK. The first phase detection block 350 generates the division control signal DVD_REVERSE corresponding to the detection result.

The second phase detection block 340 detects the phase of the system clock HCK on the basis of the data division clock DIV_WCK to determine a logic level of a training information signal TRAINING_INFO_SIG. The signal transfer block 360 outputs the training information signal TRAINING_INFO_SIG to an external controller.

In addition, the clock alignment training circuit further includes a mode register set (MRS) 370 and a mode control block 380. The mode control block 380 generates a normal training operation signal NORMAL_WCK2CK and an auto training operation signal AUTO_WCK2CK, which control normal and auto clock alignment training operations, respectively. The mode control block 380 operates in response to a training entry signal WCK2CK_ENTRY and an auto synchronization (sync) entry signal AUTOSYNC_ENTRY, predefined in the mode register set 370, respectively indicating the entry of a clock alignment training mode and the kind of a clock alignment training operation to be performed at the entry.

In the activation condition of the auto training operation signal AUTO_WCK2CK to a logic high level, the logic level control block 390 activates an auto training mode enable signal AUTO_WCK2CK_START to a logic high level, depending on the toggling of the data division clock DIV_WCK. The auto training mode enable signal AUTO_WCK2CK_START defines the period that the logic level of the division control signal DVD_REVERSE is changeable. In response to the activation of the auto training mode enable signal AUTO_WCK2CK_START, the first phase detection block 350 can enter into an auto clock alignment training mode.

Even in the activation of the auto training operation signal AUTO_WCK2CK (i.e., the auto training signal AUTO_WCK2CK has a logic high level), the logic level control block 390 inactivates the auto training mode enable signal AUTO_WCK2CK_START (i.e., shifts AUTO_WCK2CK_START to a logic low level), in response to a constant level of the data division clock DIV_WCK (i.e., DIV_WCK is not toggled), which may be a logic high or low level. Thus, the logic level control block 390 does not allow the first phase detection block 350 to enter into the auto clock alignment training mode.

Meanwhile, where the auto training operation signal AUTO_WCK2CK is a logic low level, the logic level control block 390 inactivates the auto training mode enable signal AUTO_WCK2CK_START (i.e., shifts AUTO_WCK2CK_START to a logic low level), regardless of the toggling of the data division clock DIV_WCK. Thus, the logic level control block 390 does not allow the first phase detection block 350 to enter into the auto clock alignment training mode.

When the clock division block 320 generates the data division clock DIV_WCK by dividing the data clock WCK, it inverts the generated data division clock DIV_WCK to be outputted in response to the activation of the division control signal DVD_REVERSE (i.e., DVD_REVERSE has a logic high level). The clock division block 320 outputs the generated data division clock DIV_WCK itself in response to the inactivation of the division control signal DVD_REVERSE (i.e., DVD_REVERSE has a logic low level).

The phase multiplex block 330 can generate plural multiple data division clocks MULTI_DIV_WCK__0/45/90/135/180/225/270/315 or MULTI_DIV_WCK__90/180/270, which have 45 or 90 degrees of phase difference from each other, in response to the data division clock DIV_WCK. That is, it is possible to control the number of plural multiple data division clocks generated in response to the data division clock DIV_WCK by the circuit design. Generally, the plural multiple data division clocks MULTI_DIV_WCK__0/90/180/270 having 90 degrees of phase difference from each other are generated (as is shown in the exemplary embodiment of FIG. 3).

Among the plural multiple data division clocks MULTI_DIV_WCK__0/90/180/270, the multiple data division clocks MULTI_DIV_WCK__90/270, which do not have either of the identical and opposite phases to that of the data division clock DIV_WCK, are selected to be inputted to the first phase detection block 350. When the plural multiple data division clocks MULTI_DIV_WCK__0/45/90/135/180/225/270/315 having 45 degrees of phase difference from each other are generated, the multiple data division clocks MULTI_DIV_WCK__45/90/135/225/270/315 can be selected.

The first phase detection block 350 includes a phase comparison unit 352 and a logic level driving unit 354. The phase comparison unit 352 compares the phase of the selected multiple data division clocks MULTI_DIV_WCK__90/270 with that of the system clock HCK in the activation period of the auto training mode enable signal AUTO_WCK2CK_START. In the activation period of the auto training mode enable signal AUTO_WCK2CK_START, the logic level driving unit 354 drives the division control signal DVD_REVERSE in response to output signals COMPARE_SIG__90/270 of the phase comparison unit 352.

In addition, the clock input block 300 includes a system clock (HCK) input pad 302 and input buffer 304, and a data clock (WCK) input pad 306 and input buffer 308. The HCK input pad 302 receives an external system clock OUT_HCK from an external controller, and the HCK input buffer 304 buffers the external system clock OUT_HCK from the HCK input pad 302 to output the system clock HCK/HCKb. The WCK input pad 306 receives an external data clock OUT_WCK, which has a higher frequency than the external system clock OUT_HCK, from the external controller, and the WCK input buffer 308 buffers the external data clock OUT_WCK from the WCK input pad 306 to output the data clock WCK.

The signal transfer block 360 includes a training information (TRAINING_INFO) output buffer 362 and a training information (TRAINING_INFO) output pad 364. The TRAINING_INFO output buffer 362 buffers a training information to be outputted. The TRAINING_INFO output pad 364 transfers an output of the TRAINING_INFO output buffer 362 to the external controller as the training information signal TRAINING_INFO_SIG.

Figure 4:
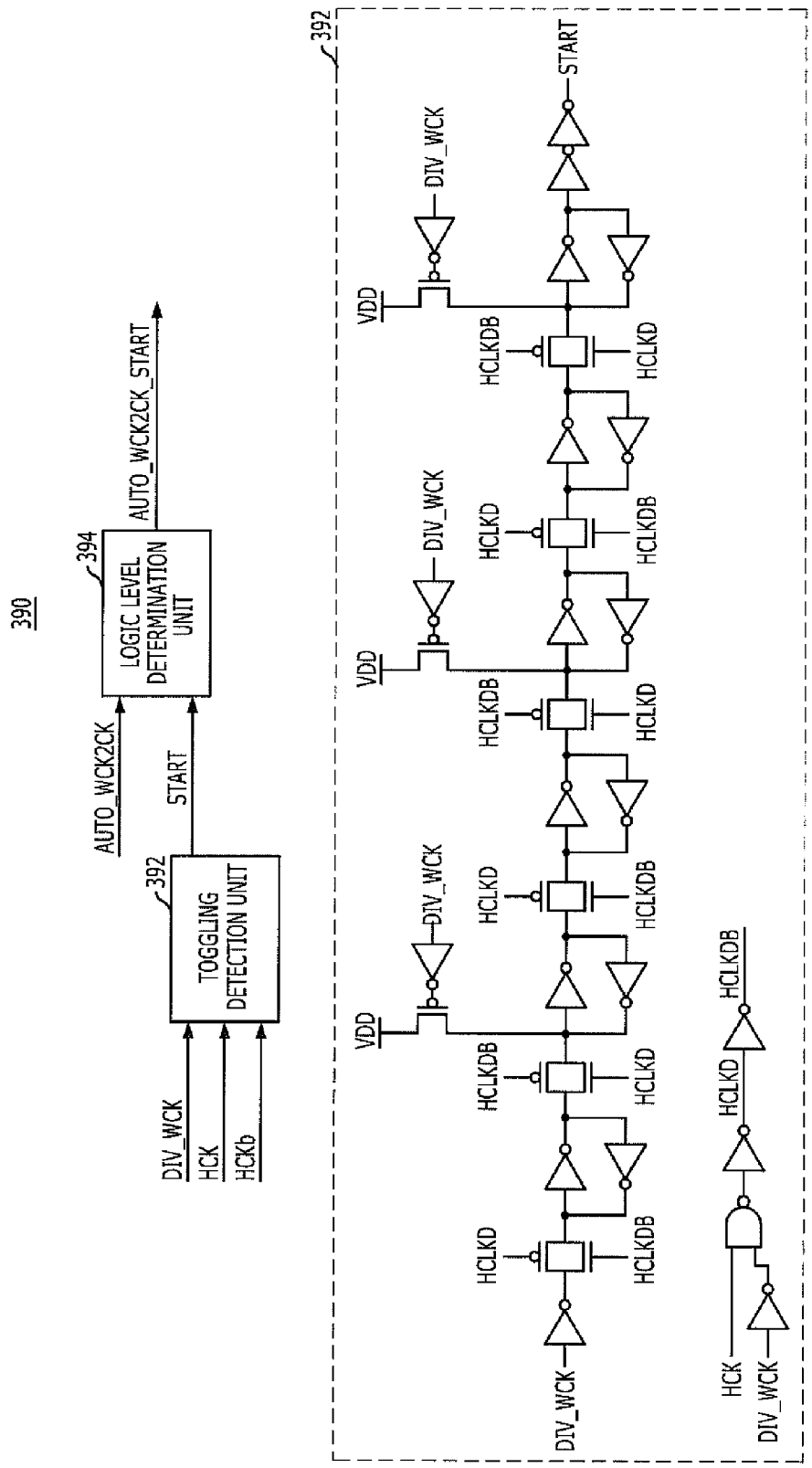
FIG. 4 is a schematic circuit diagram illustrating a logic level control block shown in FIG. 3.

FIG. 4 is a schematic circuit diagram illustrating the logic level control block 390 shown in FIG. 3.

Referring to FIG. 4, the logic level control block 390 includes a toggling detection unit 392 and a logic level determination unit 394. The toggling detection unit 392 detects the toggling of the data division clock DIV_WCK on the basis of the toggling of the system clock HCK/HCKb. The logic level determination unit 394 determines a logic level of the auto training mode enable signal AUTO_WCK2CK_START in response to the auto training operation signal AUTO_WCK2CK and an output START of the toggling detection unit 392.

The toggling detection unit 392 detects whether the data division clock DIV_WCK is toggled at the predetermined times that the system clock HCK/HCKb toggles. For example, when the data division clock DIV_WCK is toggled at the predetermined times that the system clock HCK/HCKb toggles, the toggling detection unit 392 outputs the output signal START at a logic high level (i.e., so that the output signal START is activated). When the data division clock DIV_WCK is maintained to a specific logic level for the predetermined toggles, the toggling detection unit 392 outputs the output signal START at a logic low level (i.e., so that the output signal START is inactivated).

As shown at the bottom of FIG. 4, the toggling detection unit 392 includes a plurality of flip-flops for storing and transmitting an input signal in response to the toggling of the system clock HCK/HCKb. The toggling detection unit 392 performing the described operation may be embodied in various manners depending on such a demand for the design. Thus, a detailed explanation of the toggling detection unit 392 will be omitted.

The logic level determination unit 394 activates the auto training mode enable signal AUTO_WCK2CK_START (i.e. AUTO_WCK2CK_START shifts to a logic high level), when the output signal START of the toggling detection unit 392 is activated (i.e. START shifts to a logic high level), while the auto training operation signal AUTO_WCK2CK is activated (i.e. has a logic high level). The logic level determination unit 394 inactivates the auto training mode enable signal AUTO_WCK2CK_START (i.e., shifts AUTO_WCK2CK_START to a logic low level), when the output signal START of the toggling detection unit 392 is inactivated (i.e., START shifts to a logic low level), while the auto training operation signal AUTO_WCK2CK is activated (i.e., has a logic high level). While, the auto training operation signal AUTO_WCK2CK is inactivated, the logic level determination unit 394 inactivates the auto training mode enable signal AUTO_WCK2CK_START (i.e., shifts AUTO_WCK2CK_START to a logic low level) regardless of the output signal START of the toggling detection unit 392.

The operation of the logic level control block 390 in the clock alignment training circuit in accordance with an embodiment of the present invention will be described with reference to the drawings FIGS. 5 and 6.

Figure 5:
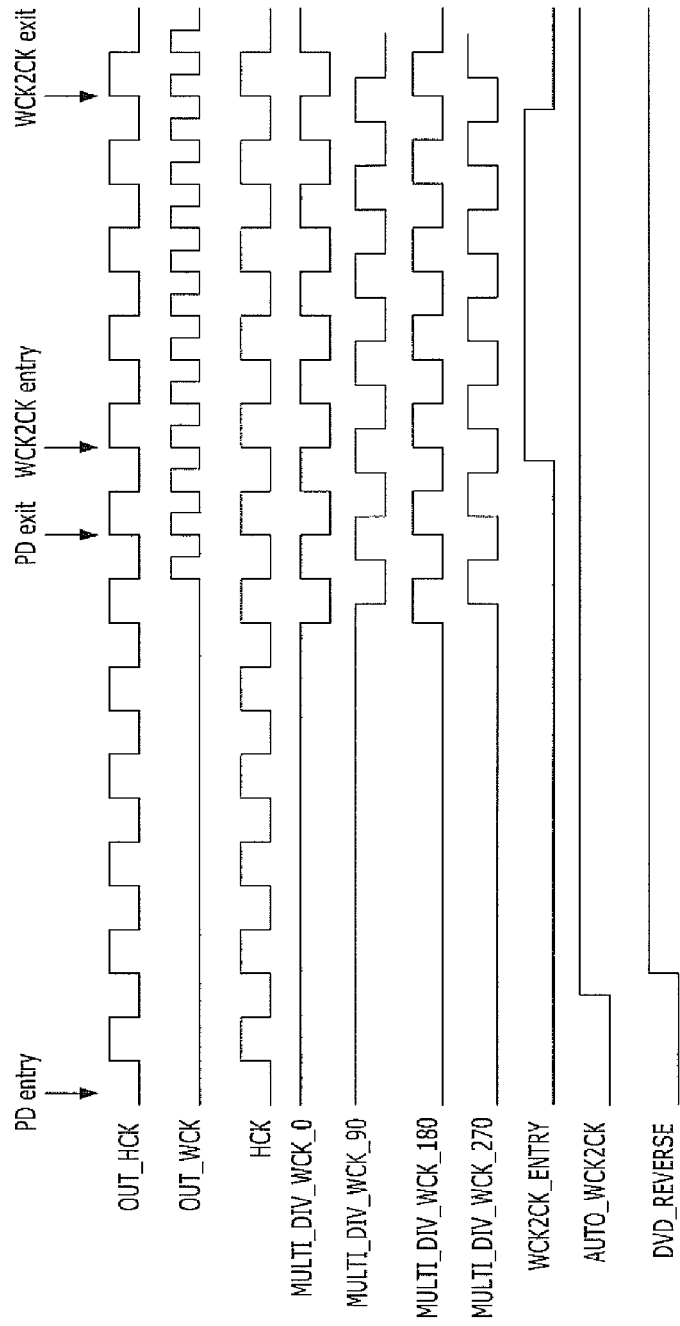
FIGS. 5 and 6 are signal timing diagrams illustrating an operation of a clock alignment training circuit in accordance with an embodiment of the present invention.

FIG. 5 is a signal timing diagram illustrating an operation of the clock alignment training circuit, which does not include the logic level control block 390. FIG. 6 is a signal timing diagram illustrating an operation of the clock alignment training circuit shown in FIG. 3.

Referring to FIG. 5, at the entry of the power down mode (PD entry), the data clock WCK (OUT_WCK) stops toggling, and the plural multiple data division clocks MULTI_DIV_WCK_0/90/180/270 may have invalid values. Nevertheless, because the auto training operation signal AUTO_WCK2CK outputted from the mode control block 380 is used as it is without passing through the logic level control block 390, the first phase detection block 350 operates when the auto training operation signal AUTO_WCK2CK is activated (i.e., AUTO_WCK2CK has a logic high level). As can be seen from FIG. 5, the division control signal DVD_REVERSE transitions from a logic low level to a logic high level in the power down mode.

Therefore, at the exit of the power down mode (PD exit), the data division clock DIV_WCK has to be inverted to be inputted to the second phase detection block 340. Therefore, the second phase detection block 340 performs the clock alignment training operation using the inverted data division clock DIV_WCK. This causes an error of the clock alignment training operation. In the worst case scenario, the clock alignment training operation may change the phase of the data clock WCK, which needs no change, by 180 degrees.

Figure 6:
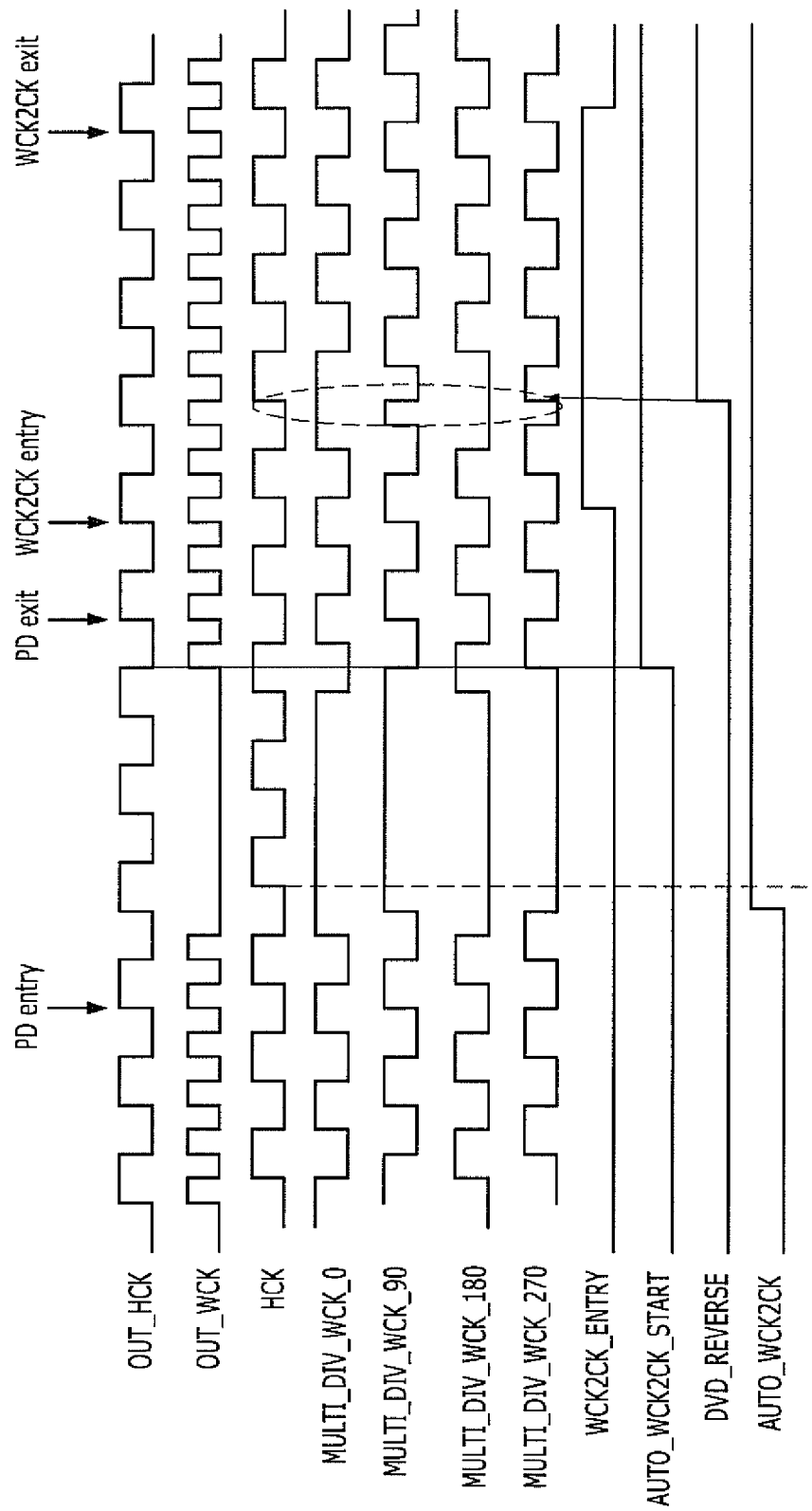

In accordance with the clock alignment training operation described in FIG. 6, the data clock WCK (OUT_WCK) also stops toggling at the entry of the power down mode (PD entry). Thus, the plural multiple data division clocks MULTI_DIV_WCK_0/90/180/270 may have invalid values. However, the logic level control block 390 maintains the auto training mode enable signal AUTO_WCK2CK_START at a logic low level even if the auto training operation signal AUTO_WCK2CK is activated (i.e., AUTO_WCK2CK has a logic high level). The auto training mode enable signal AUTO_WCK2CK_START is not activated (i.e., does not shift to a logic high level), until the data clock WCK (OUT_WCK) starts toggling again and the logic levels of the plural multiple data division clocks MULTI_DIV_WCK_0/90/180/270 are reliable. Therefore, the logic level control block prevents the logic level of the division control signal DVD_REVERSE from being determined by wrong information during the power down mode.

In the clock alignment training circuit in accordance with an embodiment of the present invention, it is possible to operate the first phase detection block 350 after the power down mode is over (i.e., after the data division clock DIV_WCK toggles again). This can reduce the time taken for performing the clock alignment training operation to a minimum.

In accordance with the embodiment of the present invention, the semiconductor device can perform the auto clock alignment training operation at the entry/exit of various operation modes, such as the power down mode. The semiconductor device is also controlled not to enter the auto clock alignment training mode during such a power down mode. When the power down mode is over, the semiconductor device can re-enter normal operation modes by checking whether the data clock WCK is inverted. Thus, at the operation mode entry/exit of the semiconductor device, the phase of the data clock WCK is able to be synchronized with that of the system clock HCK at a high speed.

While the present invention has been described with respect to the specific embodiments, it will be apparent to those skilled in the art that various changes and modifications may be made without departing from the spirit and scope of the invention as defined in the following claims. The logic gates and transistors exemplified in the above embodiments can be implemented in various ways with regards to position and type according to the polarity of the signal inputted thereto.

What is claimed is:

1. A semiconductor device, comprising:
    a clock input block configured to generate a system clock and a data clock;
    a clock division block configured to divide the data clock to generate a data division clock, wherein the data division clock is inverted in response to a division control signal;
    a phase multiplex block configured to generate a plurality of multiple data division clocks having a predetermined phase different from each other in response to the data division clock;
    a logic level control block configured to set a period, in which a logic level of the division control signal is changeable, depending on a toggling of the data division clock; and
    a first phase detection block configured to detect a phase of the system clock on the basis of selected clocks of the plurality of multiple data division clocks in the period set by the logic level control block, and to generate the division control signal corresponding to a detection result.

2. The semiconductor device of claim 1, further comprising:
    a second phase detection block configured to detect the phase of the system clock on the basis of the data division clock, and determine a logic level of a training information signal in response to a detection result; and
    a signal transfer block configured to output the training information signal.

3. The semiconductor device of claim 1, wherein the clock input block comprises:
    a system clock generating unit configured to receive an external clock for synchronizing input timings of commands and addresses, and to output the system clock; and
    a data clock generating unit configured to receive an external clock for synchronizing input timings of data, and to output the data clock.

4. The semiconductor device of claim 1, wherein the clock division block is configured to invert the data division clock to be outputted when the division control signal is activated, and to output the data division clock without being inverted when division control signal is inactivated.

5. The semiconductor device of claim 1, wherein the selected clocks are selected from the plurality of multiple data division clocks by excluding the multiple data division clocks, which have an identical phase or an opposite phase to a phase of the data division clock.

6. The semiconductor device of claim 1, wherein the logic level control block is configured to activate an auto training mode enable signal when the data division clock toggles, and to inactivate the auto training mode enable signal when the data division clock is maintained at a constant level, wherein the auto training mode enable signal sets the period in which the division control signal changes.

7. The semiconductor device of claim 6, wherein the logic level control block comprises:
   a toggling detection unit configured to detect the toggling of the data division clock on the basis of a toggling of the system clock; and
   a logic level determination unit configured to determine a logic level of the auto training mode enable signal in response to an output of the toggling detection unit.

8. The semiconductor device of claim 7, wherein the toggling detection unit is configured to detect whether the data division clock toggles at predetermined times at which the system clock toggles.

9. The semiconductor device of claim 6, wherein the first phase detection block comprises:
   a phase comparison unit configured to compare a phase of the selected clocks with the phase of the system clock in the activation period of the auto training mode enable signal; and
   a logic level driving unit configured to receive predetermined numbers of output signals of the phase comparison unit and to drive the division control signal in response to the output signals, in the activation period of the auto training mode enable signal.

10. The semiconductor device of claim 9, wherein the first phase detection block is configured to change a logic level of the division control signal when the output signals of the phase comparison unit are maintained at a same logic level, while the predetermined numbers of selected clocks change periodically.

11. A method of operating a semiconductor device receiving system and data clocks, the method comprising:
   inputting the system clock to the semiconductor device in a power down mode;
   inputting the system and data clocks to the semiconductor device when the semiconductor device exits from the power down mode;
   generating a data division clock by dividing the data clock wherein the data division clock is inverted in response to a division control signal;
   generating a plurality of multiple data division clocks having a predetermined phase different from each other in response to the data division clock;
   detecting whether the data division clock toggles;
   detecting a phase of the system clock on the basis of predetermined multiple data division clocks of the plurality of multiple data division clocks; and
   generating the division control signal in response to a detection result of the data division clock and the system clock.

12. The method of claim 11, further comprising:
   detecting the phase of the system clock on the basis of the data division clock to determine a logic level of a training information signal; and
   outputting the training information signal.

13. The method of claim 11, wherein the generating of the division control signal comprises:
   determining a logic level of the division control signal in response to the detection result of the system clock when the data division clock toggles; and
   maintaining the logic level of the division control signal when the data division clock is maintained at a constant level, regardless of the detection result of the system clock.

14. The method of claim 11, wherein the generating of the data division clock comprises:
   inverting the data division clock to be outputted when the division control signal is activated; and
   outputting the data division clock without being inverted when the division control signal is inactivated.

15. The method of claim 11, wherein the predetermined multiple data division clocks are selected from the plurality of multiple data division clocks by excluding the multiple data division clocks which have an identical phase or an opposite phase to a phase of the data division clock.

16. The method of claim 11, wherein the detecting of the data division clock includes detecting whether the data division clock toggles at predetermined times at which the system clock toggles.

* * * * *